US009632171B1

United States Patent
Herold

(10) Patent No.: US 9,632,171 B1
(45) Date of Patent: Apr. 25, 2017

(54) ACOUSTIC AIRCRAFT TRACKER AND WARNING SYSTEM

(71) Applicant: BAE Systems Information and Electronic Systems Integration Inc., Nashua, NH (US)

(72) Inventor: David Herold, Hampstead, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 62 days.

(21) Appl. No.: 14/794,017

(22) Filed: Jul. 8, 2015

Related U.S. Application Data

(63) Continuation-in-part of application No. 13/590,569, filed on Aug. 21, 2012, now abandoned.

(60) Provisional application No. 61/527,157, filed on Aug. 25, 2011.

(51) Int. Cl.
*G01S 5/20* (2006.01)

(52) U.S. Cl.
CPC ..................... *G01S 5/20* (2013.01)

(58) Field of Classification Search
CPC .......... G01S 5/22; G01S 5/30; G08B 13/1672
See application file for complete search history.

(56) References Cited

U.S. PATENT DOCUMENTS

| 4,558,439 A | 12/1985 | Gudesen |
| 4,811,308 A | 3/1989 | Michel |
| 5,544,129 A * | 8/1996 | McNelis ................. F41G 3/147 367/127 |
| 7,872,948 B2 | 1/2011 | Davis et al. |
| 7,957,225 B2 | 6/2011 | Steadman |
| 8,059,489 B1 | 11/2011 | Lee et al. |
| 2006/0227664 A1 | 10/2006 | Horak |
| 2009/0257314 A1 | 10/2009 | Davis et al. |
| 2010/0284249 A1 | 11/2010 | Steadman |

OTHER PUBLICATIONS

Duckworth et al., Fixed and wearable acoustic counter-sniper systems for law enforcement, Nov. 1998, 22 pages.

* cited by examiner

*Primary Examiner* — Daniel Pihulic
(74) *Attorney, Agent, or Firm* — Sand & Sebolt, LPA

(57) ABSTRACT

A system and method for tracking aircraft, helicopters and/or other objects at an airfield using acoustics of the aircraft, helicopters and/or other objects. A method receives first acoustical data at a first sensor and second acoustical data is also received at a second sensor. The first and second sensors may be carried by a first structurally supportive body member. Based at least in part on the first acoustical data and the second acoustical data a range and a bearing of the aircraft is determined from a predetermined location at the airfield. The range and bearing can be determined by using a beam forming algorithm. Based on the range and the bearing, the method displays the location the aircraft on a display.

18 Claims, 3 Drawing Sheets

ACOUSTIC AIRCRAFT TRACKER AND WARNING SYSTEM

CROSS REFERENCE TO RELATED APPLICATION

This application is a continuation-in-part application that claims priority from U.S. patent application Ser. No. 13/590,569, filed on Aug. 21, 2012 which claims priority from U.S. Provisional Patent Application Ser. No. 61/527,157, filed Aug. 25, 2011; the disclosures of each are incorporated herein by reference as if fully rewritten.

BACKGROUND

1. General Field

The current disclosure relates generally to apparatus, systems and methods for tracking objects. More particularly, the apparatus, systems and methods relate to tracking object using audio sensors distributed around an airfield. Specifically, the apparatus, systems and methods provide for applying beamforming algorithms on audio signals emitted by objects to track the objects.

2. Description of Related Art

One of the most critical tasks at any airport is tracking all aircraft at or near the airport. Traditionally, this is accomplished through one or a combination of ground tracking radars and visual means. However, ground tracking radars are complex and extremely expensive making them impractical for smaller commercial airports and many forward deployed military air stations. Furthermore, aircraft that are on the ground or otherwise at very low altitude are typically below radar tracking capabilities or in radar "shadow zones" such as behind the edge of a hangar or building.

Unfortunately, human visual observation and electro-optical sensors often suffer from limitations similar to those of radar. Visual methods can be even more subject to physical obstruction than radar and also suffer from severe limitations in low-visibility conditions such as darkness, fog, rain, or snow. Therefor a need exists for an aircraft tracking system that is effective at low altitudes for all environmental conditions.

Previous attempts to track objects (i.e., airplanes) around an airfield utilizing acoustical sensors are known to exist. Two such examples are provided in United States Patent Application Publication 2010/0284249 (the '249 publication) and in United States Patent Application Publication 2009/0257314 (the '314 publication). In each of the '249 publication and the '314 publication, a plurality of nodes are positioned throughout an airfield and are able to observe and "listen" for acoustical signatures of nearby aircraft. Further, in each of the '249 publication and the '314 publication, only a single node (i.e., sensor) is positioned at a single location.

SUMMARY

Issues continue to exist with currently known acoustic object tracking systems, such as the one presented in the '249 publication and the '314 publication. Namely, it may be advantageous to have more diverse acoustical sensors where some sensors may be at a same location but carried by a single structurally supportive member. The present disclosure addresses these and other issues.

According to an aspect of an embodiment of the present disclosure, an acoustic aircraft tracking system uses a distributed network of acoustic sensors around an airfield in conjunction with beamforming algorithms to locate and track aircraft within a user-defined proximity of an airfield. These sensors collect the acoustic signatures of aircraft and transmit the information back to a centralized processing and tracking computer. Sensor location information is used to implement the beamforming algorithms which allows precise localization of received acoustic signatures from the tracked aircraft. That information, along with the acoustic signature information gathered by the sensors, becomes input data for the beamformer algorithms which provide a range and bearing to the aircraft from a pre-determined location. This system can also be integrated with existing control tower assets to enable comprehensive, multi-method aircraft tracking. Therefore, an embodiment of the present invention provides an aircraft tracking system that is effective at low altitudes for virtually all environmental conditions. Some sensors may be a common locations as other sensors.

Another configuration of the preferred embodiment includes a method of tracking aircraft helicopters and/or other vehicles at an airfield using acoustics of the aircraft, helicopters and/or vehicles. The method receives first acoustical data at a first sensor and second acoustical data is received at a second sensor. The second acoustical sensor is located separate from the first sensor. Based, at least in part, on the first acoustical data and the second acoustical data, a range, and a bearing of the aircraft determined. As discussed later, the range and bearing can be determined by using a beam forming algorithm. The bearing and range can be determined from a predetermined location at the airfield. Based on the range and the bearing, the method displays the location of the aircraft on a display. This method may repeatedly determine the locations of aircraft, helicopters and/or vehicles at an airfield and update their locations on a display so that the display is a real-time representation of their locations.

In some configurations of this embodiment, the method can determine an arrival time of the first acoustical data at the first sensor and an arrival time of the second acoustical data at the second sensor. The method can determine the range and the bearing of the aircraft based, at least in part, on the arrival time of the first acoustical data at the first sensor and the arrival time of the second acoustical data at the second sensor.

In other configurations, the method can perform other actions and/or be implemented with other useful features. For example, the method can display meta-data associated with the aircraft on a display illustrating a map of the airfield. The first and second sensors can be located near existing light fixtures at the airfield airport so that they can be powered by the same power system used to power the lights. The method may be implemented with a legacy radar system and the location of the aircraft can be displayed on a display that is part of a legacy radar screen.

Another configuration of the preferred embodiment is a system for acoustically tracking objects. The system includes at least two acoustic sensors placed in an airfield configured to receive an audio signal emitted from an object operating in the airfield such as an aircraft, helicopter and/or vehicle. This system also includes beam forming logic that determines a location of the object based, at least in part, on first and second audio signals received at the sensors. The location can include a range and bearing to the object from a predetermined fixed location in the airfield. The system has display logic that displays a location of the object on a visual image. The system continues to monitor the sensor to update the position of the object on the display in real-time.

Another exemplary embodiment includes a system comprising a minimum of two sensors located at various locations at or along an airfield/landing place. Each sensor is comprised of several smaller sensors or sub-sensors (e.g., microphones), a communications link (e.g., Ethernet, RF, USB, proprietary link, etc.) and each sub-sensor is aware of its location (e.g., compass, GPS, surveyed location, etc.) and a global awareness of time (GPS, sync pulse, etc.). The sub-sensors making up the sensor within the system are filtered, sampled and utilizing onboard processing generates a bearing to the observed target aircraft(s). It may also be possible to provide an "aircraft type" with sufficient processing capabilities. This bearing, time (and type) information is transmitted to a central location for fusion with information from other sensors, air-traffic control information, etc. By using bearing and time the data at the receive station is fused to generate a global position/location (type) of the target aircraft(s).

Another exemplary embodiment may provide an acoustic object tracking system comprising: a structurally supportive first body member positioned in an airfield and mounted on a first existing powered fixture; a first acoustic sensor carried by the first body member powered by the first existing powered fixture and configured to receive a first audio signal emitted from an object operating near the airfield; a second acoustic sensor carried by the structurally supportive body member powered by the first existing powered fixture and configured to receive a second audio signal emitted from the object operating in the airfield; beam forming logic configured to determine a location of the object based, at least in part, on the first audio signal received at the first acoustic sensor and the second audio signal received at the second acoustic sensor; and a display logic configured to display the location of the object on a visual display.

In yet another aspect, an embodiment may provide a method of tracking an aircraft using acoustics of the aircraft comprising: receiving first acoustical data at a first sensor carried by a structurally supportive first body member mounted to a first existing powered fixture in an airfield; receiving second acoustical data at a second sensor carried by the first body member; receiving third acoustical data at an additional sensor carried by structurally supportive second body member mounted to a second existing powered fixture in the airfield and positioned away from the first body member; determining a range and a bearing of the aircraft from a predetermined location based, at least in part, on the first acoustical data, the second acoustical data, and the third acoustical data; and determining an arrival time of the first acoustical data at the first sensor; determining an arrival time of the second acoustical data at the second sensor; determining an arrival time of the third acoustical data at the additional sensor, wherein the determining the range and the bearing of the aircraft is based, at least in part, on the arrival times at each respective sensor; and using the range and the bearing to display a location of the aircraft on a display.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
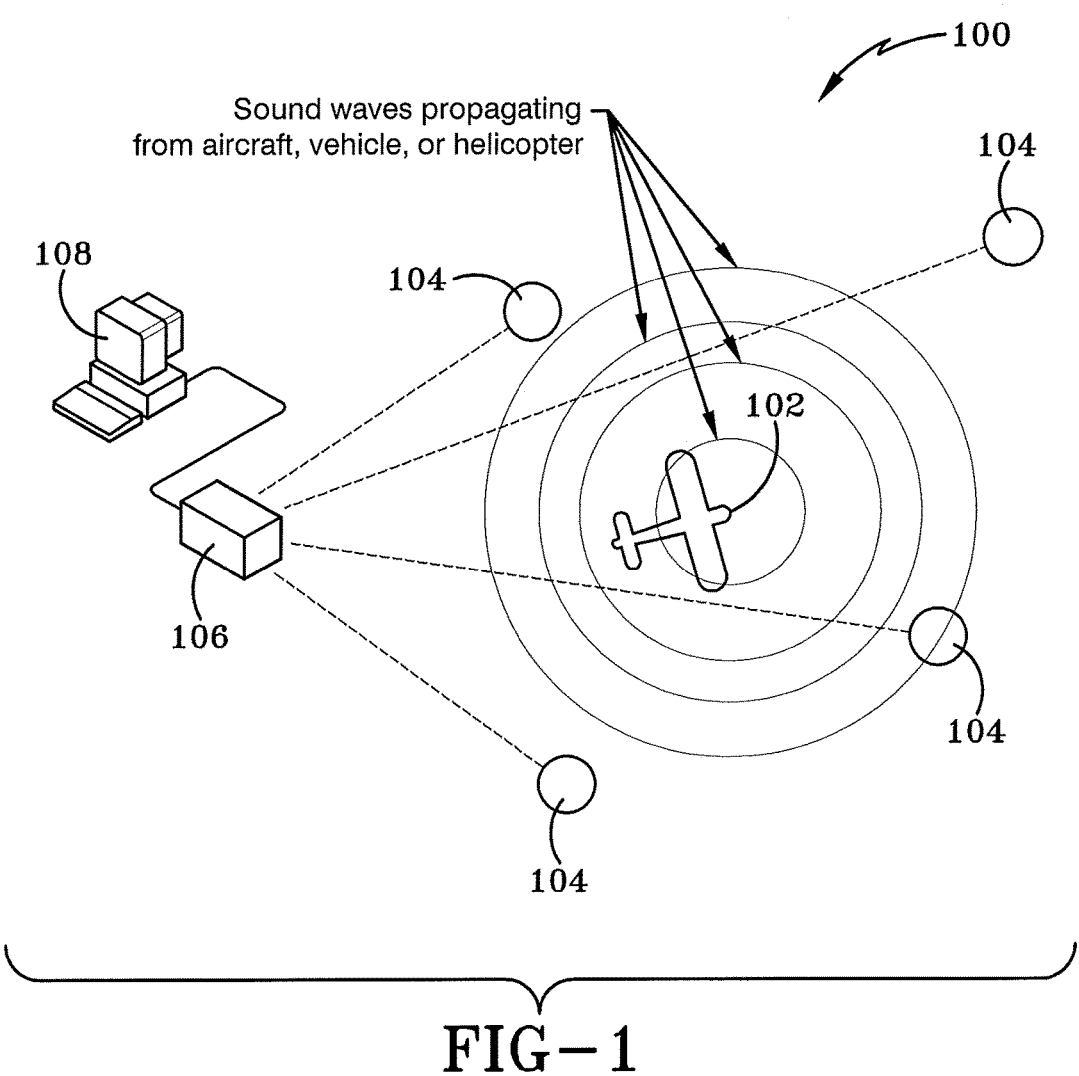
FIG. 1 illustrates a preferred embodiment of a system for acoustically tracking aircraft, helicopters, wheeled vehicles or other objects at an airfield.

FIG. 1 illustrates the preferred embodiment of an acoustic tracking system 100 for tracking aircraft 102, helicopters and/or other wheeled vehicles as they move about an airfield. The acoustic tracking system 100 has a distributed network of acoustic sensors 104 placed around an airfield that are used to collect acoustic data. It is contemplated that the sensors 104 can be located on or near existing airport assets such as lights to provide them with power or they can be implemented within a standalone system. The acoustic tracking system 100 includes beam forming logic 106 that might be part of a centralized processing and tracking computer.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

In operation, the sensors 104 in the example preferred embodiment collect the acoustic signatures of aircraft and transmits the information back to the beam forming logic 106. It is contemplated that this data is communicated via existing electrical or fiber-optic links by newly laid links or by dedicated RF links although any suitable data communication means (including wireless) would be acceptable. Data from the sensor array is processed using a detector and classifier and is then fed into the beamformer algorithms that are implemented by the beam forming logic 106 to provide a range and bearing to the aircraft from a pre-determined location, typically the control tower.

In a preferred embodiment, a display logic can display the object being tracked (in this case airplane 102) graphically on a display 108 where additional meta-data can be added to the object. This meta-data can include, but is not limited to, aircraft identification, type, flight number, etc. Ideally, the exemplary acoustic tracking system 100 can be integrated with existing control tower assets such as other tracking or identification systems to provide unified multi-method aircraft tracking.

An exemplary aircraft (airplane, helicopter, airfield vehicles or the like) tracking system 100 of the preferred embodiment of the invention has contemplated applications for small and large commercial airfields as well as military airfields that may be forward-deployed or permanent installations. The preferred system can also provide locations of aircraft to augment visible tracking by airport control personnel when aircraft are hidden from view which is particularly useful in limited visibility situations. Additional contemplated applications may include aircraft carriers, oil rigs or other mobile assets and the like that interface with aircraft and may contain blind spots either visually or on radar. Therefore, the preferred embodiment provides an aircraft tracking system 100 that is effective at low altitudes for all environmental conditions.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
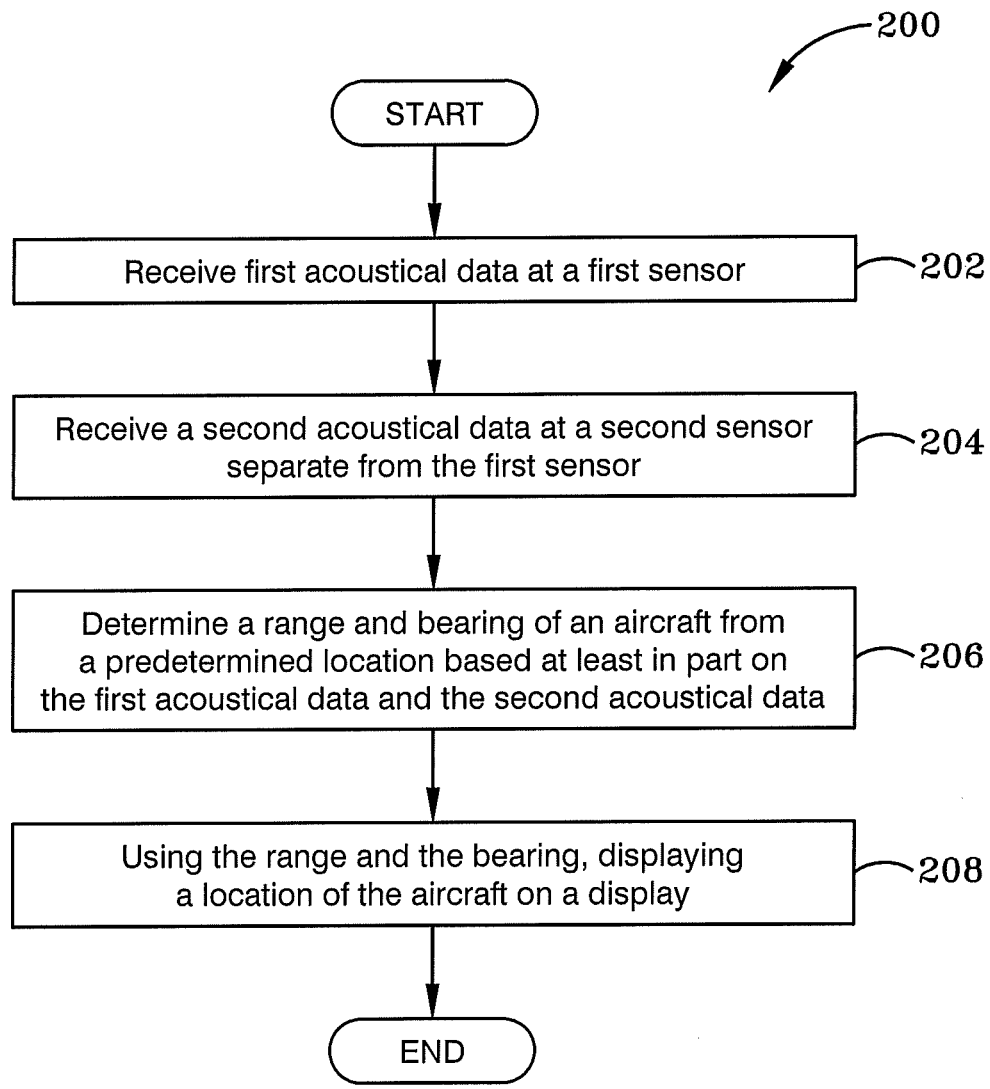
FIG. 2 illustrates an embodiment of a method for acoustically tracking aircraft, helicopters, wheeled vehicles or other objects at an airfield.

FIG. 2 illustrates a method 200 for tracking aircraft helicopters and/or other vehicles at an airfield using acoustics of the aircraft, helicopters and/or other vehicles. The method 200 receives first acoustical data, at 202, at a first sensor. Second acoustical data is also received at a second sensor, at 204, that is located separate from the first sensor. Based at least in part on the first acoustical data and the second acoustical data, a range and a bearing of the aircraft is determined, at 206. The bearing and range can be determined from a predetermined location at the airfield. Based on the range and the bearing, the method 200 displays the location of the aircraft, helicopter or other vehicle on a display, at 608. As previously discussed, the range and bearing can be determined by using a beam forming algorithm 106. This method 200 may repeatedly determine the locations of aircraft, helicopters and/or other vehicles at an airfield and update their locations on a display so that the display is a real-time representation of their locations.

In some configurations of this embodiment, the method can determine an arrival time of the first acoustical data at the first sensor and an arrival time of the second acoustical data at the second sensor. The method 200 can determine the range and the bearing of the aircraft based, at least in part, on the arrival time of the first acoustical data at the first sensor and the arrival time of the second acoustical data at the second sensor.

In other configurations, the method 200 can perform other actions and/or be implemented with other useful features. For example, the method 200 can display meta-data associated with the aircraft on a display associated with the map. The first and second sensors can be located near existing light fixtures at the airfield airport so that they can be powered by the same system powering the lights. The method 200 may be implemented with a legacy radar system and the location of the aircraft can be displayed on a display that is part of a legacy radar screen.

Figure 3:
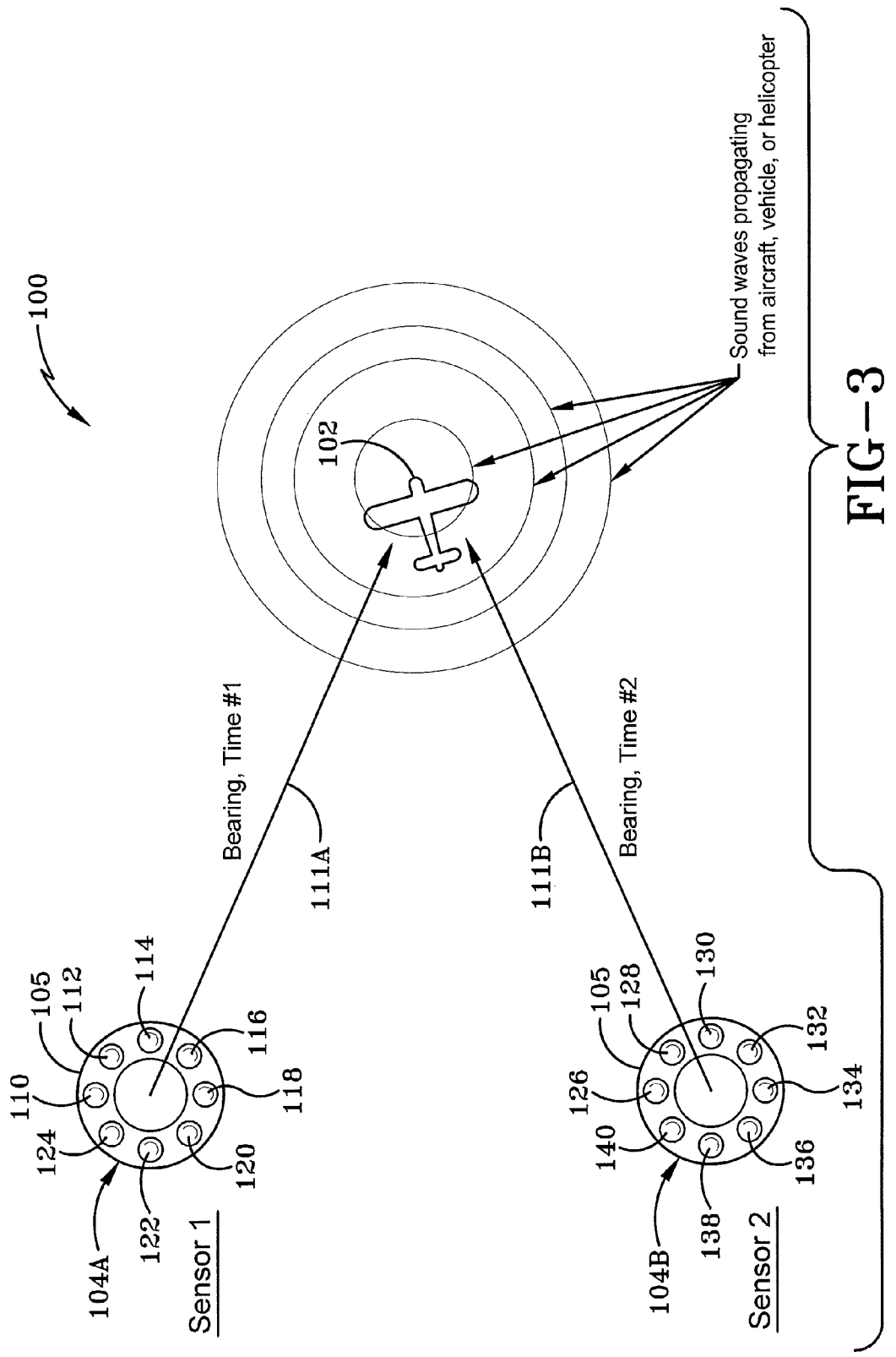
FIG. 3 illustrates a more detailed version of the preferred embodiment of a system for acoustically tracking vehicles in an airfield having a plurality of sensors carried by structural body members and powered by existing airfield fixtures.

In an additional particular embodiment depicted in FIG. 3, system 100 comprises a minimum of two sensing devices. A first sensing device 104A and a second sensing device 104B is located at various locations at or along an airfield/landing place. Each sensing device 104A and 104B carries several smaller sensors (e.g., microphones), and includes a communications link (e.g., Ethernet, RF, USB, proprietary link, etc.) and each sensor carried by its respective sensing device (either 104A or 104B) is aware of its location (e.g., compass, GPS, surveyed location, etc.) and a global awareness of time (GPS, sync pulse, etc.). The plurality of sensors making up the overall sensing device 104A or 104B within the system 100 are filtered and sampled. This may be performed by beam forming logic 106. Then, utilizing onboard processing a bearing to the observed target aircraft(s) is generated. The bearing is then displayed in an existing legacy display 108 in an aircraft control tower. It may also be possible to provide an "aircraft type" with sufficient processing capabilities. This bearing, time (and type) information is transmitted to a central location for fusion with information from other sensors, air-traffic control information, etc. By using bearing and time the data at the receive station is fused to generate a global position/location (type) of the target aircraft(s).

As depicted in FIG. 3, a first sensor device 104A comprises structurally supportive body member 105, a first acoustic sensor 110, a second acoustic sensor 112, a third acoustic sensor 114, a fourth acoustic sensor 116, a fifth acoustic sensor 118, a sixth acoustic sensor 120, a seventh acoustic sensor 122, and an eighth acoustic sensor 124.

Each of the first through eighth acoustic sensors 110, 112, 114, 116, 118, 120, 122, and 124 are carried by the structurally supportive body member 105 of first sensing device 104A. In one particular embodiment, The eight acoustic sensors a positioned circumferentially about the center of the structurally supportive body member 105.

In one particular embodiment, the structurally supportive member 105 of first sensing device 104A carrying the first through eighth acoustic sensors 110, 112, 114, 116, 118, 120, 122, and 124 is mounted on an existing powered fixture in an airfield. The existing powered fixture may include a light pole, a cell tower, a radar station, or other rigid structures having a power source. The power source powering the powered fixture is operatively coupled to first sensing device 104A such that it powers the first through eighth acoustic sensors 110, 112, 114, 116, 118, 120, 122, and 124. The first through eighth acoustic sensors 110, 112, 114, 116, 118, 120, 122, and 124 carried by body member 105 may be powered actively by the power source such that the eight sensors continuously "listen" for acoustical signatures from a target 102 operating in the airfield. Alternatively, the first through eighth acoustic sensors 110, 112, 114, 116, 118, 120, 122, and 124 may actively send out acoustic signals in order to "listen" and listen for their return acoustic signatures. Alternatively, the first through eighth acoustic sensors 110, 112, 114, 116, 118, 120, 122, and 124 carried by body member 105 may be powered passively by the power source powering the existing fixture such that the sensor "listens" for acoustical signatures from a target 102 operating in the airfield and the sensors create digital data only when a target is "heard." The first through eighth acoustic sensors 110, 112, 114, 116, 118, 120, 122, and 124 carried by body member 105 are considered to be at a common location relative to second device 104B which is positioned away from device 104A.

A second sensor device 104B comprises a structurally supportive body member 105, a first acoustic sensor 126, a second acoustic sensor 128, a third acoustic sensor 130, a fourth acoustic sensor 132, a fifth acoustic sensor 134, a sixth acoustic sensor 136, a seventh acoustic sensor 138, and an eighth acoustic sensor 140.

Each of the first through eighth acoustic sensors 126, 128, 130, 132, 134, 136, 138 and 140 are carried by the structurally supportive body member 105 of the second sensor device 104B. In one particular embodiment, the eight acoustic sensors of the second sensor device 104B are positioned circumferentially about the center of the structurally supportive body member 105. The structurally supportive body member 105 that is part of second sensor device 104B may be similar to that of body member 105 on first sensor device 104A, however it need not be the case so long as body member 105 of second device 104B is structurally sufficient to carry the first through eighth sensors 126, 128, 130, 132, 134, 136, 138 and 140.

In one particular embodiment, the structurally supportive member 105 of the second device 104B carrying the first through eighth acoustic sensors 126, 128, 130, 132, 134, 136, 138, and 140 is mounted on a second existing powered fixture in an airfield at a distance spaced away from the first sensing device 104A. The second existing powered fixture may include a light pole, a cell tower, a radar station, or other rigid structures having a power source. The power source powering the powered fixture is operative coupled to second sensing device 104B such that the power source powers the first through eighth acoustic sensors 126, 128, 130, 132, 134, 136, 138 and 140. The first through eighth acoustic sensors 126, 128, 130, 132, 134, 136, 138 and 140 of second device 104B carried by body member 105 may be powered actively by the power source such that the eight sensors continuously "listen" for acoustical signatures from a target 102 operating in the airfield. Alternatively, the first through eighth acoustic sensors 126, 128, 130, 132, 134, 136, 138 and 140 on second device 104B may actively send out acoustic signals in order to "listen" and listen for their return acoustic signatures. Alternatively, the first through eighth acoustic sensors 126, 128, 130, 132, 134, 136, 138 and 140 on second device 104B carried by body member 105 may be powered passively by the power source powering the existing fixture such that the sensor "listens" for acoustical signatures from a target 102 operating in the airfield and the sensors create digital data only when a target is "heard."

The beam forming logic 106 referenced above determines a location of the object 102 based, at least in part, on a first audio signal received at the first acoustic sensor 110 and a second audio signal received at the second acoustic sensor 112. In one particular embodiment, the bearing and time/speed of the object 102 is based, at least in part, on a first audio signal received at an acoustic sensor, such as sensor 110, at the first sensing device 104A and a second audio signal received at an acoustic sensor, such as sensor 126, at the second sensing device 104B. The bearing and first time of object 102 relative to the first sensing device 104A is shown generally as 111A. The bearing and second time of object 102 relative to the second sensing device 104B is shown generally as 111B. The beam forming logic 106 further determines a first time of arrival of a portion of the first audio signal at the first acoustic sensor 110 carried by the structurally supportive first body member 105 (of device 104A) and a second time of arrival of a same portion of the second audio signal at the acoustic sensor 126 carried by the structurally supportive second body member 105 (of device 104B), wherein the beam forming logic 106 (also referred to throughout this disclosure as beam forming algorithm 106) is determine a location of the object based, at least in part, on the first time of arrival and the second time of arrival.

Each one of the eight sensors on each respective sensing device 104A and 104B may include a geographic and temporal awareness device. The geographic and temporal awareness device may be, for example a compass, a global positioning system (GPS), or surveyed location, such that the respective sensor associated with the geographic awareness device is aware of its location. The geographic and temporal awareness device may provide that each respective acoustic sensor may have a global awareness of time, for example, through GPS or sync pulse. The geographic and temporal awareness device associated with each one the acoustic sensors is powered by the same power source powering each respective acoustic sensor. So for example, a geographic and temporal awareness device associated with acoustic sensor 110 may be powered by the first existing powered structure and a geographic and temporal awareness device associated with sensor 126 may be powered by the second existing powered structure. The geographic and temporal awareness device identifies a location and position in time of each respective sensor.

In operation, a method of tracking an aircraft using acoustics of the aircraft may include the steps of: receiving first acoustical data at a first sensor, such as sensor 110, carried by a structurally supportive first body member, such as member 105 of first device 104A, mounted to a first existing powered fixture in an airfield. Then, receiving second acoustical data at a second sensor, such as sensor 112, carried by the first body member 105 of first device 104A. Then, receiving third acoustical data at an additional sensor, such as sensor 126, carried by structurally supportive second body member 105 of second device 104B mounted to a second existing powered fixture in the airfield and positioned away from the first body member. Then, determining, through the use of beam forming algorithm 106, a range and a bearing of the aircraft 102 from a predetermined location based, at least in part, on the first acoustical data, the second acoustical data, and the third acoustical data. Then, determining an arrival time of the first acoustical data at the first sensor 110, then determining an arrival time of the second acoustical data at the second sensor 112, and then, determining an arrival time of the third acoustical data at the additional sensor 126. The step of determining the range and the bearing of the aircraft is based, at least in part, on the arrival times at each respective sensor. Then, using the range and the bearing to display a location of the aircraft 102 on a display 108.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. An acoustic vehicle tracking system comprising:
   a structurally supportive first body member positioned in an airfield and mounted on a first existing powered fixture;
   a first acoustic sensor carried by the first body member powered by the first existing powered fixture and configured to receive a first audio signal emitted from a vehicle operating near the airfield;
   a second acoustic sensor carried by the structurally supportive body member powered by the first existing powered fixture and configured to receive a second audio signal emitted from the vehicle operating near the airfield;
   a structurally supportive second body member positioned in the airfield mounted on a second existing powered fixture spaced from the first existing powered fixture;
   a first acoustic sensor carried by the second body member powered by the second existing powered fixture and configured to receive audio signals emitted from the vehicle operating near the airfield;
   a second acoustic sensor carried by the structurally supportive second body member powered by the second existing powered fixture and configured to receive audio signals emitted from the vehicle operating near the airfield;
   a plurality of geographic and temporal awareness devices that are respectively associated with each one the acoustic sensors powered by the same power source powering each respective acoustic sensor, wherein each geographic and temporal awareness device identifies a location and position in a global awareness of time at each respective sensor;
   beam forming logic configured to determine a location of the vehicle based, at least in part, on the first audio signal received at the first acoustic sensor on the first body member and the second audio signal received at the second acoustic sensor on the first body member and the audio signals received at the first acoustic sensor and received at the second acoustic sensor on the second body member; and
   a display logic configured to display the location of the vehicle on a visual display.

2. The acoustic vehicle tracking system of claim 1 wherein both the first and second acoustic sensors on the first body member are powered actively by the first existing airfield fixture.

3. The acoustic vehicle tracking system of claim 1 wherein both the first and second acoustic sensors on the first body member are powered passively by the first existing airfield fixture.

4. The acoustic vehicle tracking system of claim 1, further comprising:
   a plurality of structurally supportive body members positioned throughout the airfield, each one of the plurality of structurally supportive body members carrying first and second sensors.

5. The acoustic vehicle tracking system of claim 1, further comprising:
   a third acoustic sensor carried by the first body member;
   a third acoustic sensor carried by the second body member; and
   the third acoustic sensor carried by the first body member powered by the first existing powered fixture and the third acoustic sensor carried by the second body member powered by the second existing powered fixture.

6. The acoustic vehicle tracking system of claim 5, further comprising:
   a fourth acoustic sensor carried by the first body member;
   a fourth acoustic sensor carried by the second body member; and
   the fourth acoustic sensor carried by the first body member powered by the first existing powered fixture and the fourth acoustic sensor carried by the second body member powered by the second existing powered fixture.

7. The acoustic vehicle tracking system of claim 6, further comprising:
   a fifth acoustic sensor carried by the first body member;
   a fifth acoustic sensor carried by the second body member; and
   the fifth acoustic sensor carried by the first body member powered by the first existing powered fixture and the fifth acoustic sensor carried by the second body member powered by the second existing powered fixture.

8. The acoustic vehicle tracking system of claim 7, further comprising:
   a sixth acoustic sensor carried by the first body member;
   a sixth acoustic sensor carried by the second body member; and
   the sixth acoustic sensor carried by the first body member powered by the first existing powered fixture and the sixth acoustic sensor carried by the second body member powered by the second existing powered fixture;
   a seventh acoustic sensor carried by the first body member;
   a seventh acoustic sensor carried by the second body member; and
   the seventh acoustic sensor carried by the first body member powered by the first existing powered fixture and the seventh acoustic sensor carried by the second body member powered by the second existing powered fixture;
   an eighth acoustic sensor carried by the first body member;
   an eighth acoustic sensor carried by the second body member; and
   the eighth acoustic sensor carried by the first body member powered by the first existing powered fixture and the eighth acoustic sensor carried by the second body member powered by the second existing powered fixture.

9. The acoustic vehicle tracking system of claim 8, wherein the eight acoustic sensors carried by the first body member are positioned circumferentially about a center of the first body member.

10. The acoustic vehicle tracking system of claim 9, wherein the eight acoustic sensors carried by the second body member are positioned circumferentially about a center of the second body member.

11. The acoustic vehicle tracking system of claim 1, wherein the location of the vehicle includes a range and bearing to the vehicle from a predetermined fixed location in the airfield; and
   wherein the beam forming logic further determines a first time of arrival of a portion of the first audio signal and a second time of arrival of a same portion of the second audio signal, wherein the beam forming logic determines a location of the vehicle based, at least in part, on the first time of arrival and the second time of arrival.

12. The acoustic vehicle tracking system of claim 11 wherein the vehicle is one of the group of: a wheeled vehicle, an airplane, and a helicopter.

13. The acoustic vehicle tracking system of claim 12 wherein the display logic applies meta-data associated with the vehicle on the display.

14. The acoustic vehicle tracking system of claim 13 wherein the meta-data includes at least one or more of the group of: aircraft type, aircraft identification and flight number.

15. The acoustic vehicle tracking system of claim 14 wherein the display logic is configured to display the location on an existing legacy radar screen located in an aircraft control tower.

16. A method of tracking an aircraft near an airfield using acoustics of the aircraft comprising the steps of:
receiving first acoustical data at a first sensor carried by a structurally supportive first body member mounted to a first existing powered fixture in an airfield;
receiving second acoustical data at a second sensor carried by the first body member;
receiving third acoustical data at an additional sensor carried by structurally supportive second body member mounted to a second existing powered fixture in the airfield and positioned away from the first body member;
powering a plurality of geographic and temporal awareness devices by the same power source powering each respective acoustic sensor, wherein each geographic and temporal awareness device is respectively associated with each one the acoustic sensors to identify a location and position in a global awareness of time at each respective sensor;
determining a range and a bearing of the aircraft from a predetermined location based, at least in part, on the first acoustical data, the second acoustical data, and the third acoustical data relative to the location and position in the global awareness of time at each respective sensor; and
determining an arrival time of the first acoustical data at the first sensor;
determining an arrival time of the second acoustical data at the second sensor;
determining, with a beam forming algorithm, an arrival time of the third acoustical data at the additional sensor, wherein the determining the range and the bearing of the aircraft is based, at least in part, on the arrival times at each respective sensor; and
using the range and the bearing to display a location of the aircraft on a display.

17. The method of claim 16, further comprising the steps of:
powering the first sensor actively from a same power source as the first existing powered fixture;
powering the second sensor actively from the same power source as the first existing powered fixture; and
powering the additional sensor actively from a same power source as the second existing powered fixture.

18. The method of claim 16, further comprising the steps of:
powering the first sensor passively from a same power source as the first existing powered fixture;
powering the second sensor passively from the same power source as the first existing powered fixture; and
powering the additional sensor passively from a same power source as the second existing powered fixture.

* * * * *